United States Patent
Deonarine et al.

(10) Patent No.: US 8,396,261 B2
(45) Date of Patent: Mar. 12, 2013

(54) METHOD FOR RED-EYE DETECTION

(75) Inventors: Jonathan Deonarine, Houston, TX (US); Matthew Gaubatz, Ithaca, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 282 days.

(21) Appl. No.: 13/056,139

(22) PCT Filed: Aug. 1, 2008

(86) PCT No.: PCT/US2008/072010
§ 371 (c)(1),
(2), (4) Date: Jan. 27, 2011

(87) PCT Pub. No.: WO2010/014114
PCT Pub. Date: Feb. 4, 2010

(65) Prior Publication Data
US 2011/0142337 A1    Jun. 16, 2011

(51) Int. Cl.
*G06K 9/00* (2006.01)
(52) U.S. Cl. ........ 382/117; 338/128; 338/274; 338/275; 348/78
(58) Field of Classification Search .................. 382/117, 382/128, 274, 275; 348/77, 78
See application file for complete search history.

(56) References Cited

U.S. PATENT DOCUMENTS

| | | | |
|---|---|---|---|
| 5,432,863 A | 7/1995 | Benati et al. | |
| 6,873,743 B2 | 3/2005 | Steinberg | |
| 7,174,034 B2 * | 2/2007 | O'Callaghan | 382/117 |
| 7,343,028 B2 * | 3/2008 | Ioffe et al. | 382/118 |
| 7,536,036 B2 * | 5/2009 | Steinberg et al. | 382/117 |
| 7,585,085 B1 * | 9/2009 | Holman | 362/183 |
| 7,953,250 B2 * | 5/2011 | Steinberg et al. | 382/117 |

FOREIGN PATENT DOCUMENTS

WO    WO-03-071484 A1    8/2003
WO    WO-2005-022466 A2    3/2005

OTHER PUBLICATIONS

The International Search Report and the Written Opinion of the International Searching Authority for International App No. PCT/US2008/072010 dated Aug 1, 2008, pp. 11.

* cited by examiner

*Primary Examiner* — Yosef Kassa
(74) *Attorney, Agent, or Firm* — Chun-Liang Kuo

(57) ABSTRACT

A method involving generating a pixel map of a digital image, scanning the pixel map and labeling a found red pixel, where each row of the pixel map is scanned for a red pixel, where a coordinate of each labeled red pixel is stored and compared to surrounding red pixels, arranging found labeled red pixels with previously found labeled red pixels that have a corresponding y-axis coordinate thereby creating a contiguous group, determining if the contiguous group is a red-eye artifact, and creating a list of coordinates that denote red-eye artifacts within the digital image.

15 Claims, 7 Drawing Sheets

METHOD FOR RED-EYE DETECTION

BACKGROUND

Despite the technology improvements in reducing the occurrence of red-eye in photographs, red-eye continues to be a prevalent problem for professionals, consumers, and companies. Many solutions have attempted to tackle this frequent problem, including creating red-eye reduction algorithms. However, most previous approaches attempting to address the red-eye problem have involved simply reducing the resolution of the image prior to applying detection processing. In addition, the previous algorithms were designed for computational speed and robustness of performance, as opposed to memory efficiency.

Previous algorithms have required up to 7 additional planes, requiring 7 bytes of storage per pixel. One plane is needed to store a measurement of redness in RGB space, one plane to store a measurement of redness in CieLab space, four planes to store integrated RGB redness values, and one plane to store a binary map of pixels that pass the redness thresholds. Although these approaches have yielded satisfactory results on a personal computer, the same cannot be said for embedded hardware. Existing red-eye reduction algorithms often require a large amount of available memory. Devices which rely on embedded hardware, such as printers, digital cameras, scanners, and all-in-one devices have typically not performed well in utilizing red-eye reduction algorithms due to memory restrictions.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

Figure 1:
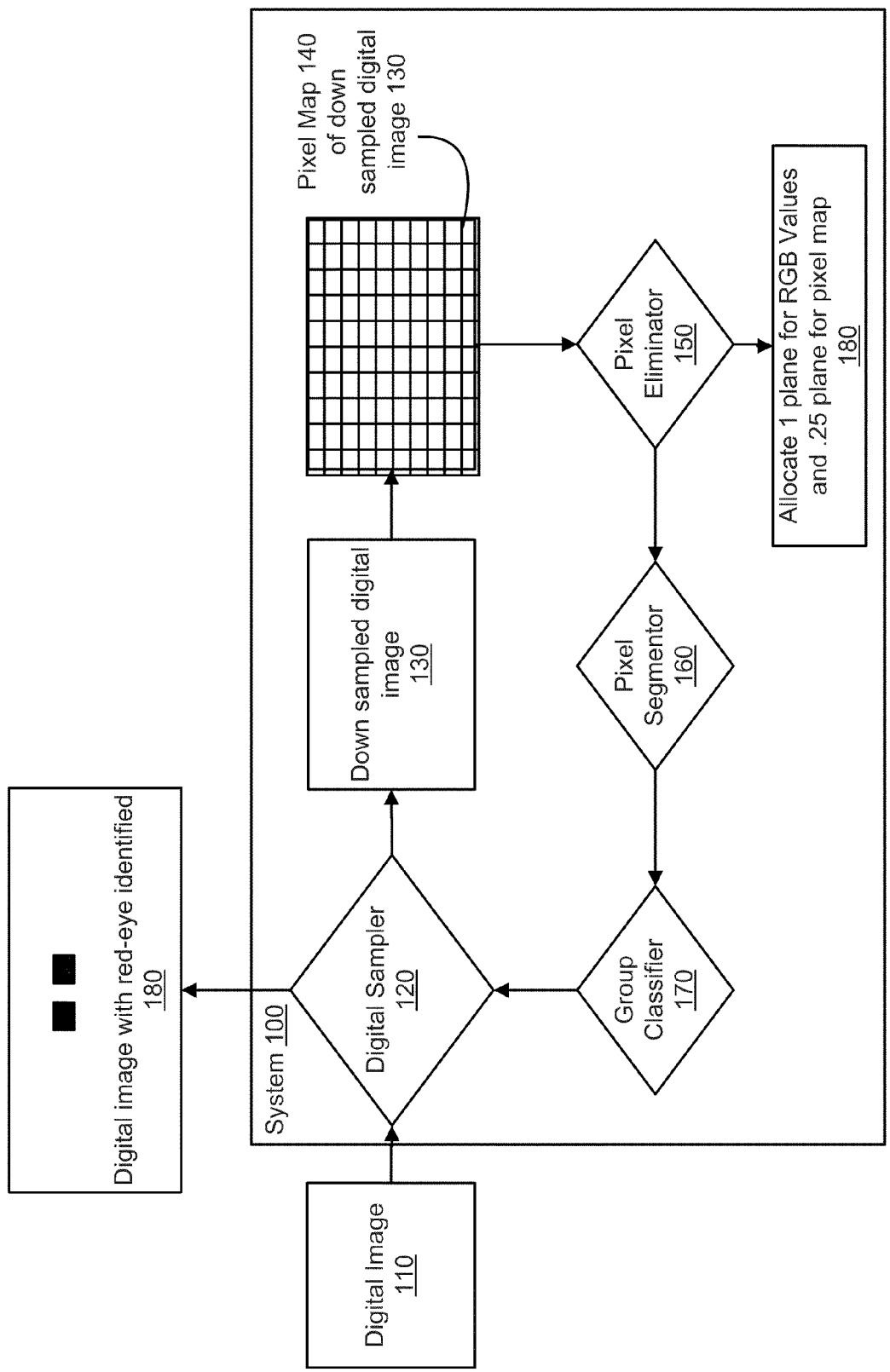
FIG. 1 illustrates a digital image being accessed by the system and a digital image with red-eye identified, produced by the system.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

FIG. 1 illustrates a digital image 110 being accessed by the system 100 and a digital image with red-eye identified 180, produced by the system 100. The system includes a digital sampler 120, a down sampled digital image 130, a pixel map 140 of the down sampled digital image 130, a pixel eliminator 150, a pixel segmentor 160, and a group classifier 170. As can be appreciated by those of ordinary skill within the art, the system 100 may include additional components or sub-systems, in addition to and/or in lieu of those depicted in FIG. 1.

As noted above, the digital image 110 is accessed by the system 100. The digital sampler 120, illustrated in FIG. 1, receives the digital image 110 and creates a down sampled digital image 130. A pixel map 140 of the down sampled digital image 130 is then created and accessed by the pixel eliminator 150. As noted above, the pixel eliminator 150, as illustrated in FIG. 1, accesses the pixel map 140 of the down sampled digital image 130. The pixel eliminator 150 scans each pixel contained in the pixel map 140 of the down sampled digital image 130 and computes the redness level of each pixel. The computation of the redness level of each pixel may be completed in one or more stages.

Figure 2:
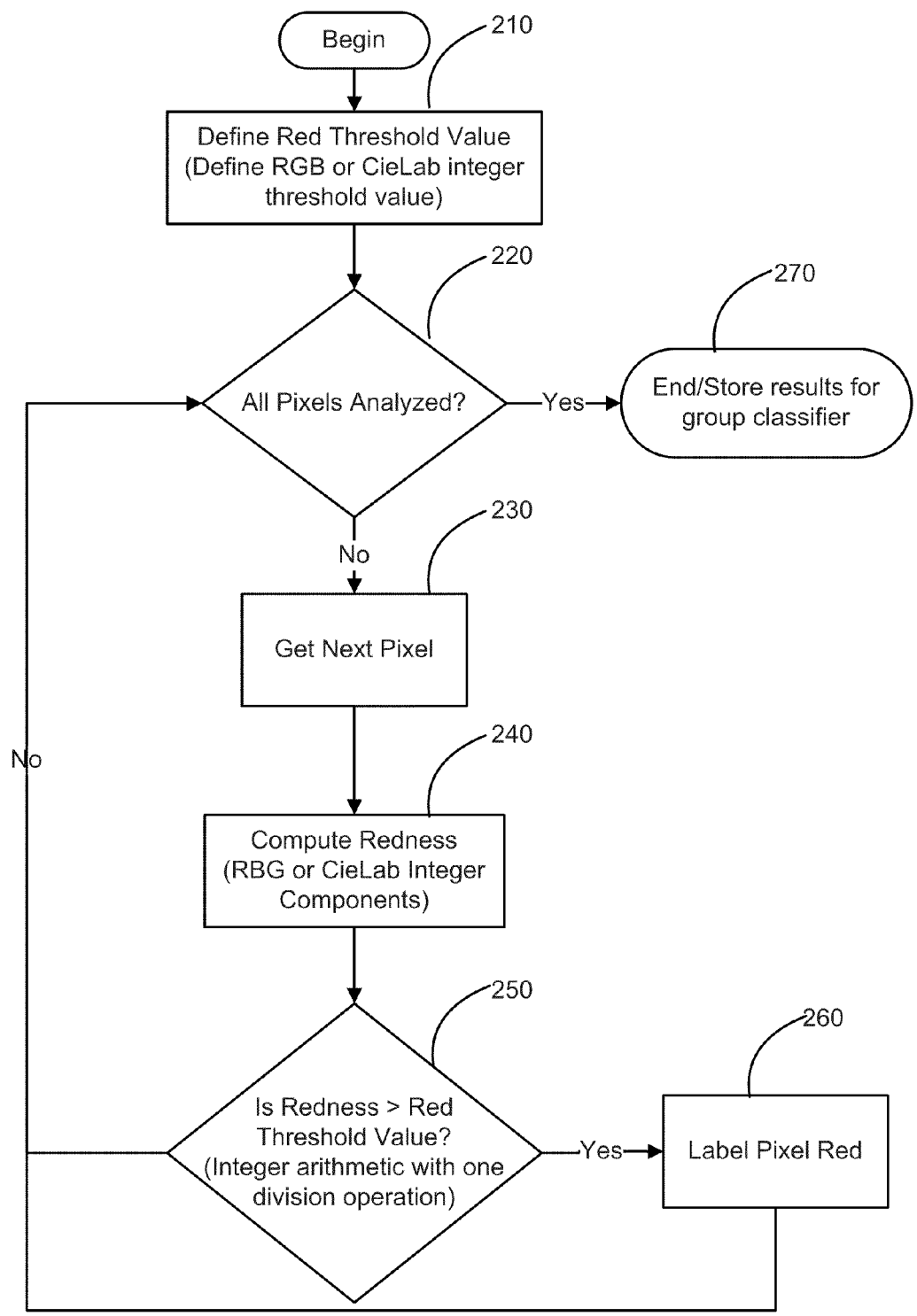
FIG. 2 is a flow chart illustrating a method for labeling red pixels according to an embodiment of the invention.

Operation of the pixel eliminator 150 as depicted in FIG. 1 will now be explained with reference to the flowchart in FIG. 2. FIG. 2 is a flow chart illustrating a method for labeling pixels according to an embodiment of the invention. The method may be performed by the system 100 in one embodiment. In the embodiment wherein the method of FIG. 2 is performed by system 100, computing the redness value of each pixel, entails pixel eliminator 150 initially defining a red threshold value as in step 210. The pixel eliminator may then check if each pixel on the pixel map 150 has been analyzed and labeled in step 220. The pixel eliminator 150 may scan for any unlabeled pixels on the pixel map 140 and then get the next pixel, as in step 230. The pixel eliminator may then compute the redness of each pixel, as in step 240. In computing the redness of each pixel, the pixel eliminator compares the redness level of the pixel being currently scanned with a defined red threshold value, as in step 250.

The redness of each pixel is measured from a pixel color component. If the redness value is above the threshold value, then the pixel is labeled as "red", as in step 260. If the redness value is below the threshold value, the redness computation is aborted and the method returns to step 220. The pixel eliminator 150 may then scan for and compute the redness of any additional unlabeled pixels on the pixel map 140.

In another embodiment, in computing the redness level of each pixel on the pixel map 140, the pixel eliminator 150 may further determine RGB integer values for the red-labeled pixels and use integer arithmetic with only one division operation being used in step 210. The pixel eliminator may then create threshold RGB values and compare these values to the RGB integer values of the red-labeled pixels from step 210. The system 100 may then record a result of the computation and use the results in the group classifier 170, as in step 270. In another embodiment, the above computations may be performed using a pixel's CieLab values in step 210. As can be appreciated by those of ordinary skill in the art, the redness value of each pixel on the pixel map 140 may be computed using other methods or values, in addition to and/or in lieu of those depicted in FIG. 1 and FIG. 2.

As can be appreciated by one of ordinary skill in the art, the pixel eliminator 150 of FIG. 1 uses a single plane to store an RGB-based measurement of redness 180. In addition, experimental results of this algorithm have resulted in only a quarter of a plane used to store the pixel map of pixels that pass through the pixel eliminator 180. As a result, the dynamic memory requirement for the algorithm has been reduced by over a factor of 5 since only 1.25 bytes per a pixel are required for the embodiment of FIGS. 1 and 2. The amount of image-dependent memory required to process the digital image 110 is thus greatly reduced. In addition, the proposed approach has a drastically smaller dynamic memory footprint, especially when compared to traditional approaches in which 7 bytes per pixel may be required. Furthermore, in performing a single division operation, the system saves clock cycles and processing time. Many previous approaches have revolved around the idea of continuously computing averages, requiring multiple division operations, of a color component or a redness measurement across many regions of the same size.

Embodiments of the present invention differ from previous approaches by performing a single division operation, which results in improved performance times and less resource allocation in embedded hardware devices. As a result, the present invention uses fewer resources and thus creates opportunities for the host device to perform additional tasks while detecting red-eye. In one embodiment, the method of FIG. 2 may be performed in batch mode or as a background routine performed while the user browses images on a portable printing device or hand held digital camera. Thus, performing the method of FIG. 2, especially as a background process, would not be obvious or apparent to one of ordinary skill in the art.

Returning now to FIG. 1, the pixel map 140 of sampled digital image 130, with pixels labeled by pixel eliminator 150, is then passed to the pixel segmentor 160. The pixel segmentor 160 operates entirely on the pixel map 140 and scans each row of the pixel map for labeled red pixels and creates a "contiguous group" of labeled red pixels when one or more labeled red pixels is found to be adjacent to one another. A "contiguous group" is defined herein as one or more labeled red pixels that may result in a red-eye in the digital image.

Figure 3:
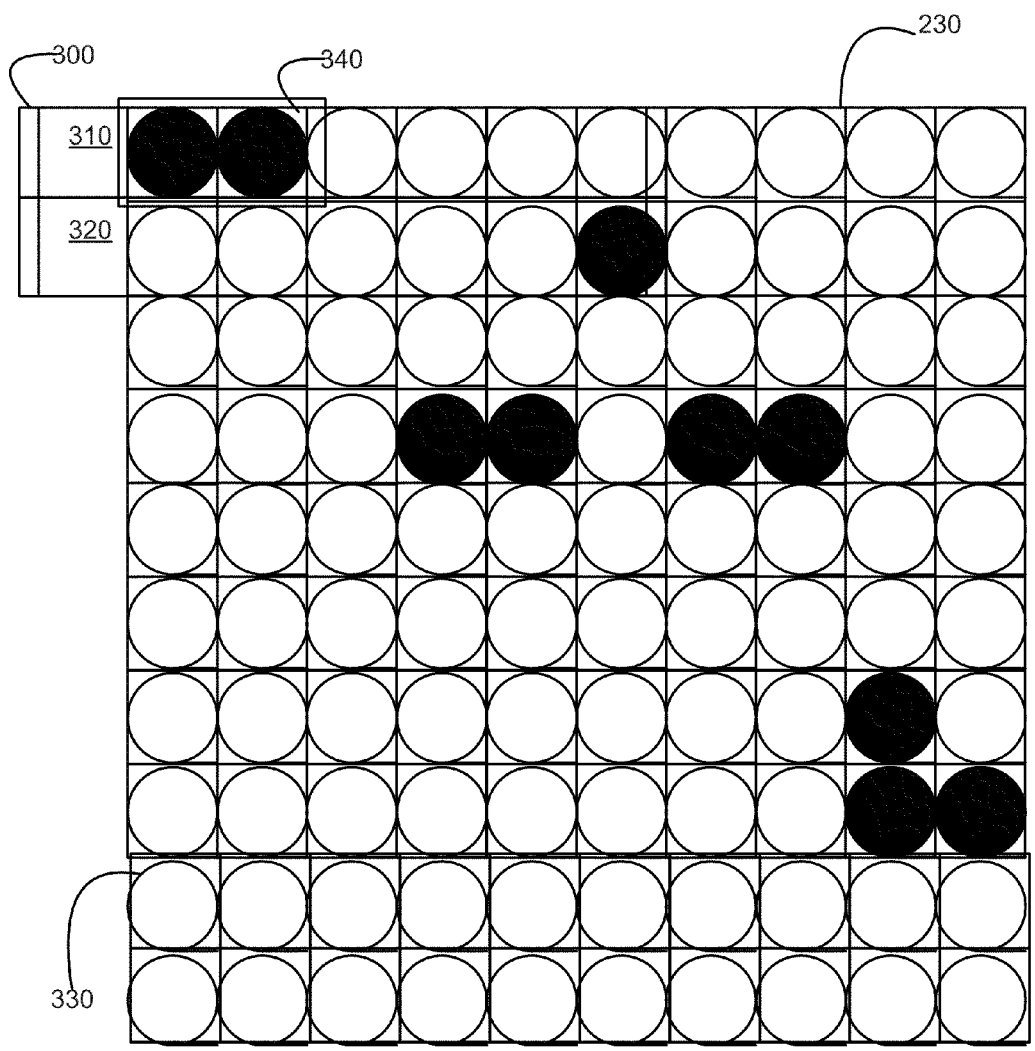
FIG. 3 illustrates a representation of a two dimensional array tracing over the pixel map, according to an embodiment of the invention.

FIG. 3 illustrates a representation of a two dimensional array 300 tracing over the pixel map 140 of down sampled digital image 130 (of FIG. 1), according to an embodiment of the invention. The example of FIG. 3 includes a pixel map 140, a bottom 20% of the pixel map 330 that is not scanned, layer one (310) of the two dimensional array 300, and layer two (320) of the two dimensional array 300.

In one embodiment, the pixel segmentor 160 initially generates a two dimensional array 300. The two dimensional array 300 may be used to scan the pixel map 140 for labeled red pixels and store the coordinates of the found and labeled red pixels on the pixel map 140. A first layer of the array 300 (such as layer 310) may be used to scan through each row of the pixel map 140 to search for a labeled red pixel. A second layer 320 of the array 300 may be used to store coordinates of previously found labeled red pixels from a previously scanned row. In another embodiment, a doubly-linked list may also be used to scan the pixel map and store information from the pixel map. As can be appreciated by those of ordinary skill in the art, additional scanners and organizers may be used to scan and store additional information, in addition to and/or in lieu of those depicted in FIG. 3

Figure 4:
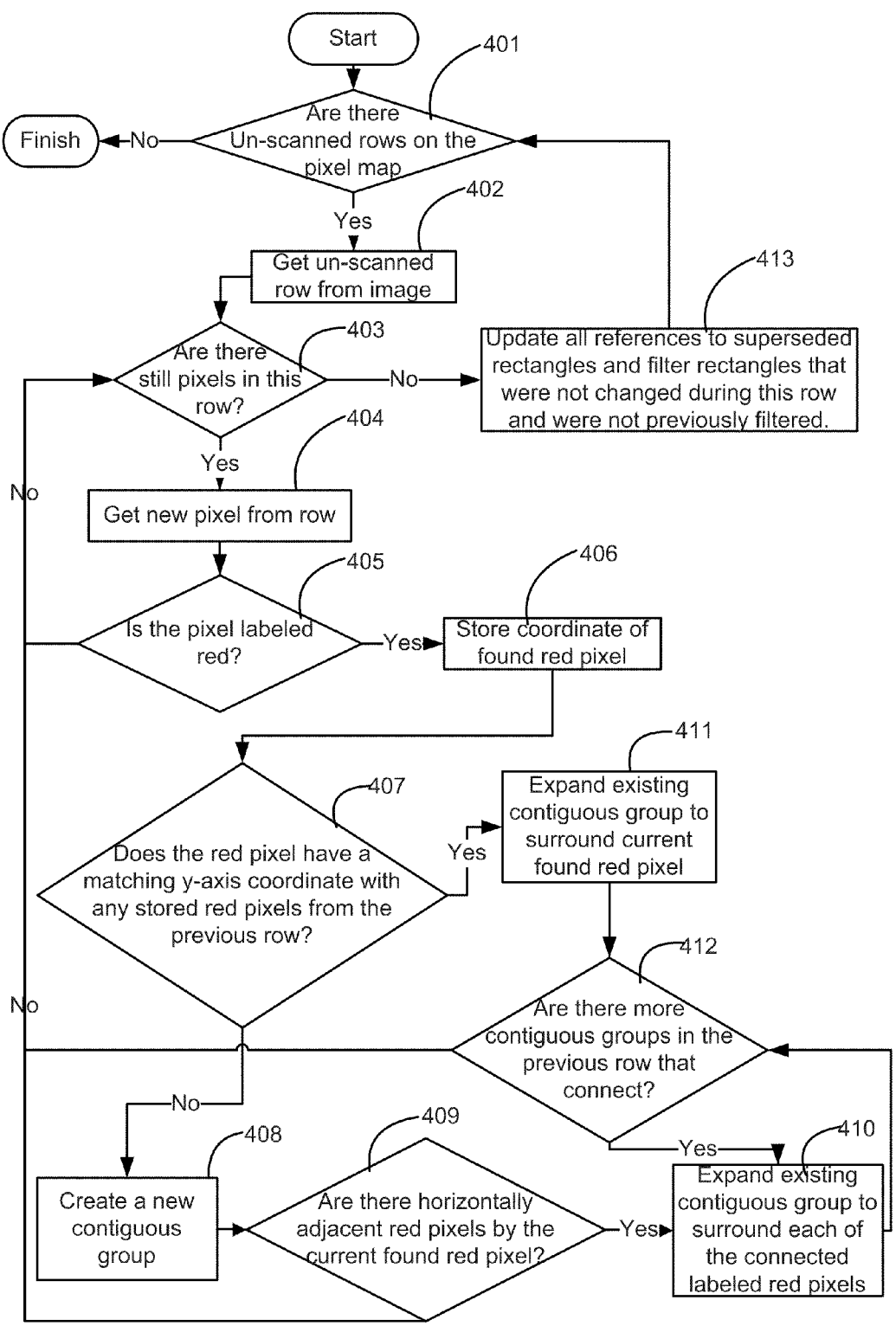
FIG. 4 is a flow chart illustrating a method for creating and expanding contiguous groups according to an embodiment of the invention.

Operation of the pixel segmentor 160 (of FIGS. 1 and 3) will now be explained with reference to the flowchart in FIG. 4. FIG. 4 is a flow chart illustrating a method for creating and expanding contiguous groups according to an embodiment of the invention. In one embodiment, the pixel segmentor 160 may check the pixel map 140 to determine if there are any un-scanned rows on the pixel map 140, as in step 401. If the result of step 401 indicates that each row of the pixel map has been scanned, then the pixel segmentor 160 may terminate and proceed to the group classifier 170 (of FIG. 1). If each row has not been scanned, the first layer 310 of the array may be used to temporarily store the coordinates of any red pixels found during a scan of the un-scanned row 402.

The first layer 310 of the array may then determine if there are still pixels in the row 403. If there are not, then the pixel segmentor 160 updates all existing contiguous groups and proceed to the next row 413. If there are still pixels in the row, the pixel segmentor 160 checks each pixel in the row, as in step 404. The pixel segmentor 160 checks if each pixel is labeled red, as in step 405. If no labeled red pixel is found, the pixel segmentor 160 proceeds to scan the rest of the pixels in the row 403. If a labeled red pixel is found, the pixel segmentor 160 stores the coordinate of the found labeled red pixel in the second layer 320 of the array, as in step 406.

The pixel segmentor 160 may then compare the coordinate of the found labeled red pixel with each previously found labeled red pixel, stored in the second layer 320 of the array, to determine if any of the previously found labeled red pixels' coordinates have a matching corresponding y-axis coordinate from the previous row, as in step 407. If a match is found, the pixel segmentor 160 expands the existing contiguous group 340 to surround the current found red pixel, as in step 411. If no match is found, then the pixel segmentor 160 creates a new contiguous group 340, 408 and further determines if there are horizontally adjacent red pixels by the current found red pixel 409. If there are no horizontally adjacent red pixels by the current found red pixel, then the pixel segmentor 160 continues to scan the row for labeled red pixels, as in step 403. If one or more red pixels are found to be horizontally adjacent to the current found labeled red pixel, then the pixel segmentor 160 expands the existing contiguous group 340 to surround the current found labeled red pixel, as well as the red pixels horizontally adjacent to the found labeled red pixel from step 410.

The pixel segmentor 160 then determines if there are any existing contiguous groups, such as contiguous group 340 in the previous row that connect as in step 412 or overlapping with the expanded contiguous group 340. If no connecting or overlapping contiguous group is found, the pixel segmentor continues to scan the row for labeled red pixels 403. If a connecting or overlapping contiguous group 340 is found in the previous row, then the expanded contiguous group 340 is expanded again to surround all connected labeled red pixels 410. The pixel segmentor 160 then proceeds to scan the rest of the row and each row of the pixel map for labeled red pixels and repeat the previous criteria for creating and expanding contiguous groups 340. As can be appreciated by those of ordinary skill in the art, additional elements or factors may be considered in the creation and expanding of contiguous groups, in addition to and/or in lieu of those depicted in FIG. 3

Traditional approaches have involved tests to determine inclusion of a candidate pixel inside complex 3-dimensional shapes in a non-standard color space, whereas the present invention has optimized a strategic order of operations for memory performance. The pixel segmentor 160 is accomplished with a single pass over the pixel map and results in simpler and faster comparison operations. Because the proposed approach uses a more standard color space for this purpose, preexisting hardware acceleration algorithms can now be employed for color conversion.

In addition, the pixel segmentor 160 only scans the upper 80% of the image since experiments have shown that candidate artifacts rarely appear in the bottom 20% of the image 330. The above embodiment optimizes operations for memory performance and does not require additional processing time or memory resources to scan unnecessary pixels. As a result, utilizing the above embodiment would not be obvious or apparent to one of ordinary skill in the art.

After each row of the pixel map 140 is scanned for labeled red pixels by the pixel segmentor 160, the group classifier 170 checks each contiguous group 340 and determines if the contiguous group is a red-eye in the digital image 110, as shown in FIG. 1 (180). The group classifier 170 runs a series of tests described herein after, on each contiguous group 340 and considers the size of the contiguous group 340 as well as the pixels surrounding the contiguous group 340.

Figure 5:
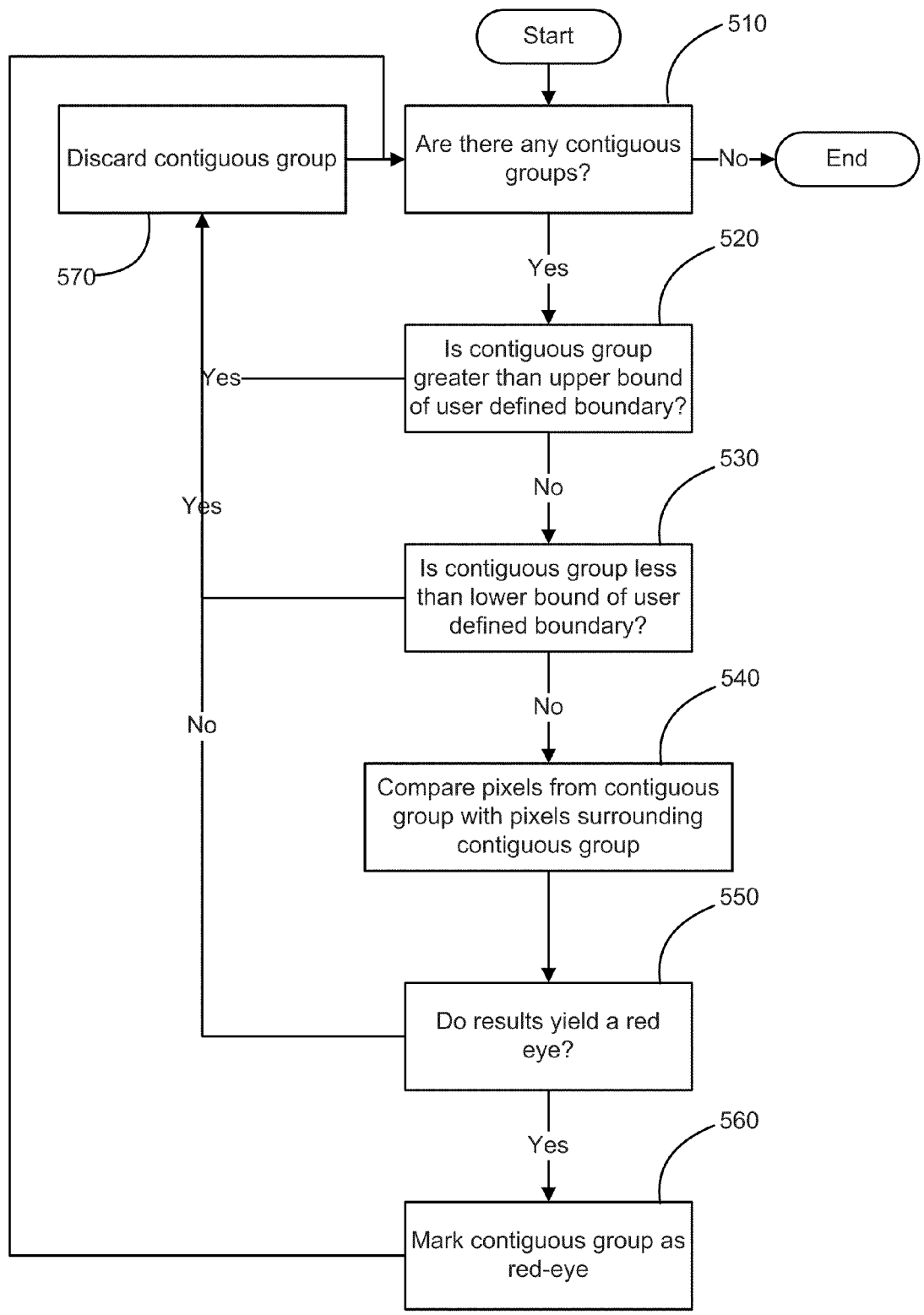
FIG. 5 is a flow chart illustrating a method for determining if a contiguous group is a red-eye.

Operation of the group classifier 170 as depicted in FIG. 1 will now be explained with reference to the flowchart of FIG. 5, which illustrates a method for determining if a contiguous group is a red-eye. The method may be performed by the system 100 in one embodiment. In one embodiment, the group classifier 170 may first check to determine if there are any contiguous groups 340, as in step 510. If any contiguous groups are found, the group classifier 170 defines an upper and lower threshold values. In one embodiment, the group classifier 170 of the system 100 may include pre-programmed values of the upper threshold values and the lower threshold. In another embodiment, the upper and lower threshold values may be defined by the user. As can be appreciated by one of ordinary skill in the art, the upper threshold values and lower threshold values may be defined by means, in addition to and/or in lieu of those depicted in FIG. 5.

The group classifier 170 then compares the size of the contiguous group 340 with the user-defined upper threshold value and the user defined lower threshold value. In one embodiment, the group classifier 170 may compare the size of each contiguous group 340 with the upper threshold value and determines if the contiguous group 340 is larger than the upper threshold group 520. If the size of the contiguous group 340 is larger than the upper threshold value, then the contiguous group 340 is discarded 670. If the contiguous group 340 is not larger, the group classifier 170 then compares the size of the contiguous group 340 with the lower threshold value 530. If the size of the contiguous group 340 is smaller than the lower threshold value, then the contiguous group 340 is discarded 670.

If the size of the contiguous group 340 is larger than the lower bound threshold value and smaller then the upper bound threshold value, then the group classifier 170 compares the labeled red pixels of the contiguous group 340 with the pixels that surround the contiguous group 340, as in step 540. The group classifier 170 then determines if the pixels surrounding the contiguous group 340 are of a color that typically represents an eye, as in step 550. If the pixel color is correct, then the contiguous group 340 is marked as a red-eye 560. As can be appreciated by one of ordinary skill in the art, the group classifier 170 may consider additional factors and elements when determining if a contiguous group 340 is a red-eye in the digital image 110, in addition to and/or in lieu of those depicted in FIG. 5.

Figure 6:
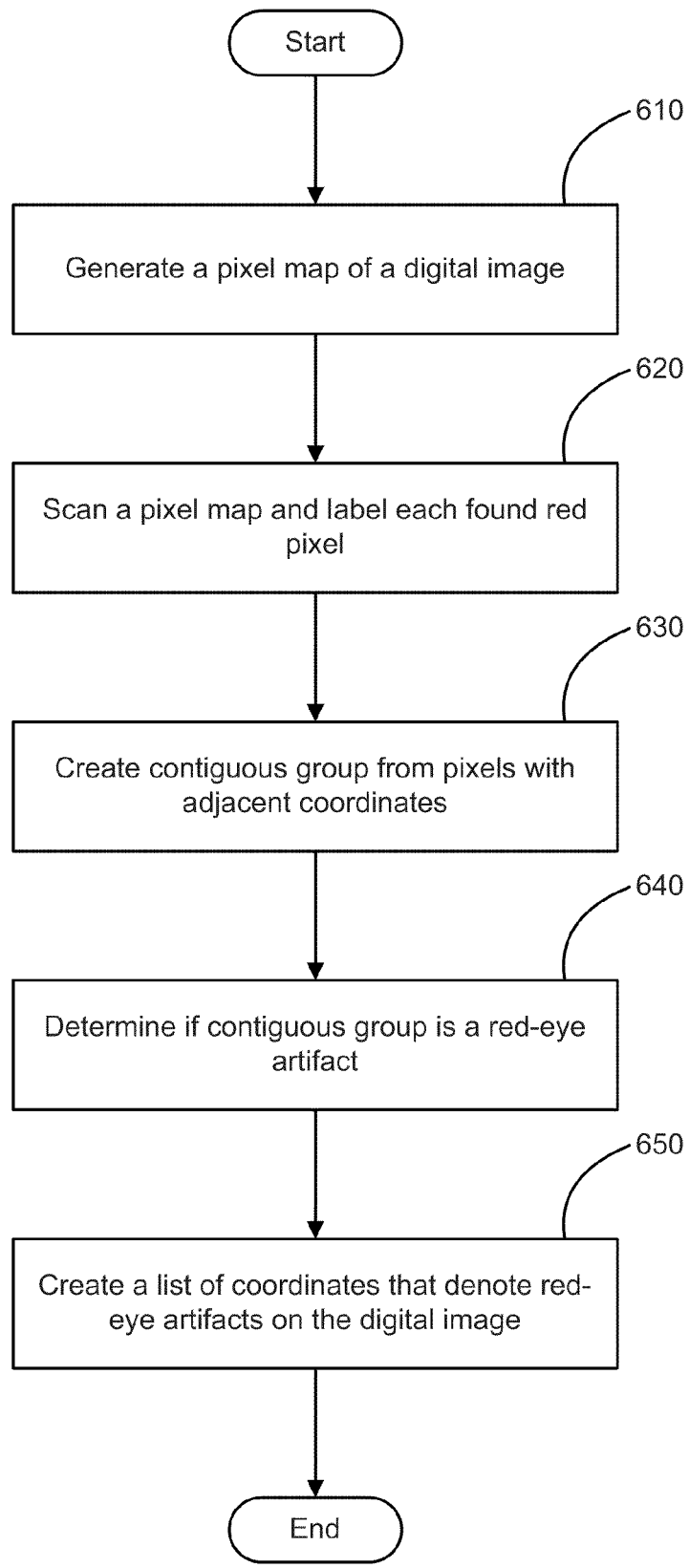
FIG. 6 is a flow chart illustrating a high level method for detecting red eye, according to an embodiment of the invention.

Operation of the system 100 as depicted in FIG. 1 will now be explained with reference to the flowchart in FIG. 6, which illustrates a high level method for detecting red eye, according to an embodiment of the invention. The method may be performed by the system 100 in one embodiment. In the embodiment of FIG. 6, a pixel map 140 is generated by the system 100, as in step 610. The system 100 then scans the pixel map 140 and label each found red pixel, as in step 620. In addition, the system 100 may create contiguous groups 340 from pixels with adjacent coordinates as in step 630. Next, the system 100 may then determine if each contiguous group 340 is a red-eye artifact, as in step 640. The system 100 may then create a list of coordinates that denote red eye artifacts on the digital image, as in step 650.

As noted above, the digital image 110, illustrated in FIG. 1, is accessed by the system 100. The digital image 110 may be stored locally in a device, apparatus, or on a storage medium connected to the device or apparatus or through a network. In one embodiment, the digital images may be stored and accessed through a universal storage device that is connected to a printer. In another embodiment, the digital image 110 may be stored on a server or another computer that may be accessed by the system 100 through a network. As can be appreciated by those of ordinary skill within the art, the digital image 110 accessed by the system 100 may be stored in additional local or networked locations, in addition to and/or in lieu of those depicted in FIG. 1.

Further, as noted above, the digital sampler 120, illustrated in FIG. 1, receives the digital image 110 and creates a down sampled digital image 130. The digital sampler is a digital scaler which may reduce or increase the resolution of the original digital image 110. In one embodiment, the digital sampler 120 may receive the digital image 110 and sample down the digital image 110 to create a down sampled digital image 130. In another embodiment, the digital sampler 120 may receive a digital image and sample up the digital image and create a digital image with red-eye identified 180. As can be appreciated by those of ordinary skill within the art, the digital sampler 120 may sample additional images or data, in addition to and/or in lieu of those depicted in FIG. 1.

As illustrated in FIG. 1, a pixel map 140 of the down sampled digital image 130 is then created and accessed by the pixel eliminator 150. In one embodiment, the pixel map 140 is a two-dimensional map of each pixel on the down sampled digital image 130. In another embodiment, the pixel map 140 may be a three dimensional map of each pixel on a three dimensional image. As can be appreciated by those of ordinary skill in the art, the pixel map 140 may be of different dimensions to represent a digital image 110, in addition to and/or in lieu of those depicted in FIG. 1.

Figure 7:
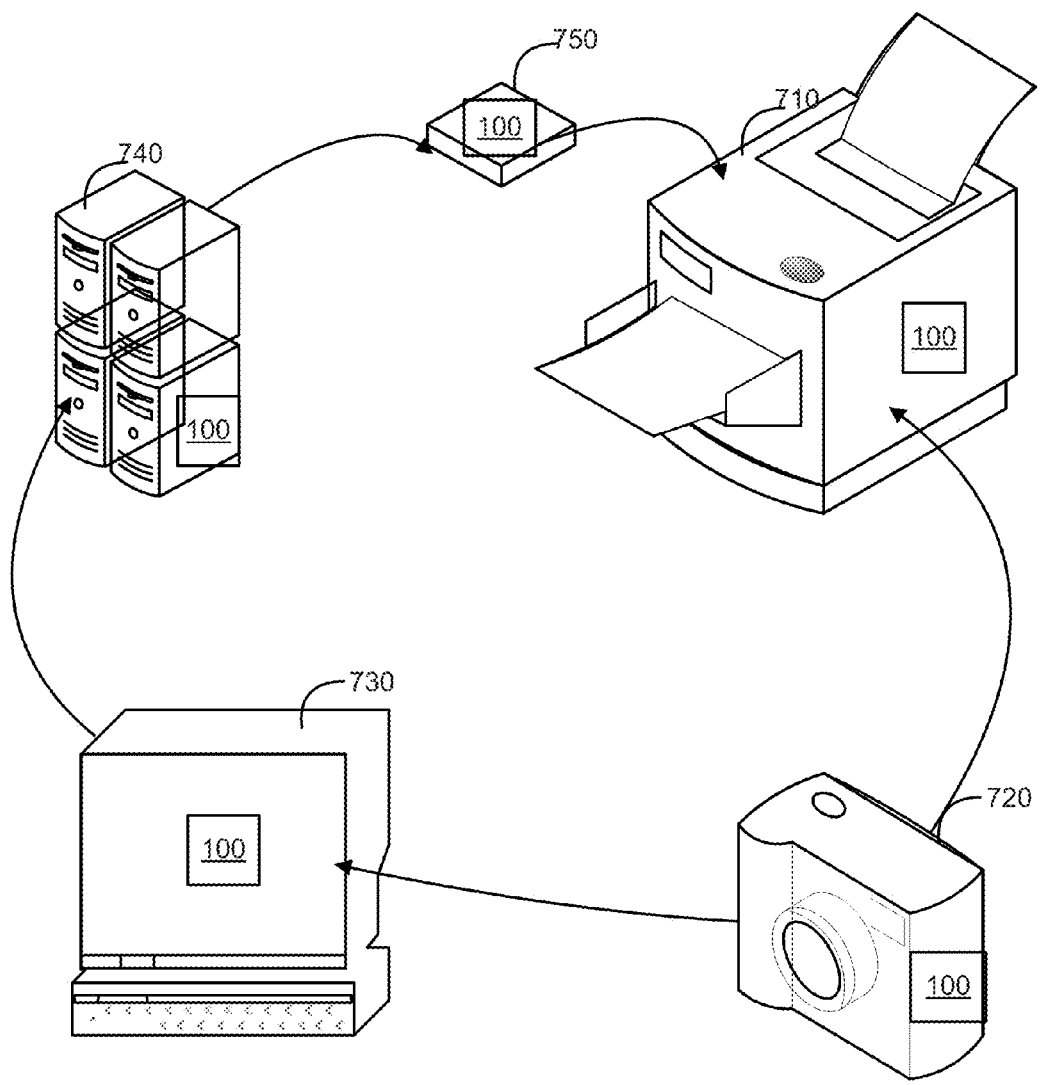
FIG. 7 illustrates different apparatuses and devices, a printer, a digital camera, a computer, a server, and a storage medium which may use the system independently or in conjunction with one another.

FIG. 7 illustrates various apparatuses and devices, a printer 710, a digital camera 720, a computer 730, a server 740, and a storage medium 750 which may use the system 100 independently or in conjunction with one another. In one embodiment, the system 100 may be used independently on a single device or apparatus, such as a printer 710, digital camera 720, or a computer system 730. In another embodiment, the system 100 may be used in conjunction with multiple apparatuses or devices, such as through a digital camera 720 connected to a printer 710, a computer 730 connected to a printer 710, or a digital camera 720 connected to a computer 730, which is connected to a printer 710. As can be appreciated by those of ordinary skill within the art, different apparatuses or devices may use the system independently or in conjunction with one another in addition to and/or in lieu of those depicted in FIG. 7.

As shown in FIG. 7, the system 100 may be embedded onto the hardware of the device or apparatus, such as a on the non-volatile memory of a printer 710, a digital camera 720, or a computer 730. In addition, the system 100 may be stored locally on a computer 730 or a storage medium 750 and accessed by the computer 730 or other devices or apparatuses connected to the computer 730 or storage medium 750. Further, the system 100 may be stored or accessed through a network 740. In one embodiment, the network 740 may be connected to the World Wide Web and may be accessed by one or more computers 730, printers 710, or digital cameras 720, which may utilize the system 100 through a network.

The present invention allows a wider range devices and apparatuses to include red-eye detection as a feature. As can be appreciated by those of ordinary skill within the art, the system may be stored and accessed in different apparatuses or devices in addition to and/or in lieu of those depicted in FIG. 1

What is claimed is:

1. A method comprising:
   generating a pixel map of a digital image;
   scanning the pixel map and labeling a found red pixel;
   wherein each row of the pixel map is scanned for a red pixel;
   wherein a coordinate of each labeled red pixel is stored and compared to surrounding red pixels;
   arranging found labeled red pixels with adjacent previously found labeled red pixels thereby creating a contiguous group;
   determining if the contiguous group is a red-eye artifact; and
   creating a list of coordinates that denote red-eye artifacts within the digital image.

2. The method of claim 1, further comprising storing coordinates of each labeled red pixel in an array.

3. The method of claim 2, wherein the array is a two-dimensional array.

4. The method of claim 3, wherein a first layer of the array stores the coordinates of red pixels in a present row of the pixel map and wherein a second layer of the array stores previous coordinates of found red pixels in a previously scanned row.

5. The method of claim 4, wherein a coordinate of a found labeled red pixel on first layer of the array is compared to a coordinate of a found labeled red pixel on second layer of the array to determine if the found labeled red pixel and a previous found labeled red pixel have a matching corresponding y-axis coordinate and the previous found pixel resides on the previous row.

6. The method of claim 1, wherein the scanning and storing of found labeled red pixels on the pixel map may be performed by a doubly linked list.

7. The method of claim 5, wherein a new contiguous group is created if the found labeled red pixel has a matching corresponding y-axis coordinate with the previous found labeled red pixel from the previous row and a contiguous group does not already exist.

8. The method of claim 7, wherein an existing contiguous group is expanded to surround all adjacent found labeled red pixels and previously found labeled red pixels.

9. A system for determining the presence of red-eye comprising:
   a digital sampler;
   wherein a digital image is sampled down by the digital sampler;
   a pixel map;
   wherein the pixel map is a two dimensional map of the digital image;
   a pixel eliminator;
   a pixel segmentor;
   wherein the pixel segmentor passes over the data using a two dimensional array a single time; and
   a group classifier that checks contiguous groups of red pixels to determine if a red-eye condition exist.

10. The system of claim 9, wherein the group classifier discards non red-eye contiguous groups that are outside the user defined boundaries for a red-eye.

11. The system of claim 10, wherein the group classifier compares pixels from the contiguous group with pixels surrounding the pixel group to determine if the contiguous group is a red eye.

12. A method for determining the presence of red eye comprising:
   scanning a pixel map and measuring a redness level of each pixel with a redness computation;
   wherein the redness computation is completed in one or more stages;
   wherein the redness level of each pixel is compared to a defined redness threshold in each stage;
   labeling each found red pixel and storing the corresponding coordinates on the pixel map;
   arranging found labeled red pixels with previously found labeled red pixels that have a corresponding y-axis coordinate thereby creating a contiguous group;
   determining if the contiguous group is a red-eye artifact; and
   creating a list of coordinates that denote red-eye artifacts within the digital image.

13. The method of claim 12 wherein the redness computation is performed by integer arithmetic and requires at most one division operation.

14. The method of claim 13 wherein a current pixel that has a redness level above a redness threshold is labeled red.

15. The method of claim 12 wherein the redness computation may use RGB or CieLab components.

* * * * *